(12) United States Patent
Hsiao et al.

(10) Patent No.: US 12,096,869 B2
(45) Date of Patent: Sep. 24, 2024

(54) REPOSITIONABLE BAG-RETAINING DEVICE

(71) Applicant: Toshiba Global Commerce Solutions Holdings Corporation, Tokyo (JP)

(72) Inventors: Rebecca Hsiao, Durham, NC (US); Merrick Wang, Durham, NC (US); Kenter Su, Durham, NC (US); Wayne Liu, Durham, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 665 days.

(21) Appl. No.: 17/315,253

(22) Filed: May 7, 2021

(65) Prior Publication Data

US 2022/0354277 A1    Nov. 10, 2022

(51) Int. Cl.
| | |
|---|---|
| A47F 9/04 | (2006.01) |
| B25B 11/00 | (2006.01) |
| F16B 1/00 | (2006.01) |
| H01F 7/02 | (2006.01) |
| H01F 7/04 | (2006.01) |
| H01F 7/20 | (2006.01) |

(52) U.S. Cl.
CPC ............ *A47F 9/042* (2013.01); *B25B 11/002* (2013.01); *F16B 1/00* (2013.01); *H01F 7/02* (2013.01); *H01F 7/04* (2013.01); *F16B 2200/83* (2023.08); *H01F 7/20* (2013.01)

(58) Field of Classification Search
CPC ..... H01F 7/02; H01F 7/04; H01F 7/20; F16B 1/00; F16B 2200/83; B25B 11/002; B65B 67/1233; B65B 67/1227; A47F 2009/041; A47F 9/04; A47F 9/042; A47F 13/085; A47F 5/0884

USPC .......................................................... 211/12
See application file for complete search history.

(56) References Cited

U.S. PATENT DOCUMENTS

| 946,108 | A | * | 1/1910 | Carpenter | ................. B60R 7/02 |
| | | | | | 211/12 |
| 1,350,443 | A | * | 8/1962 | Edstrom | ............. B65B 67/1255 |
| | | | | | 211/12 |
| 3,628,632 | A | * | 12/1971 | Lambert | ................. A47F 9/043 |
| | | | | | 53/391 |
| 3,747,298 | A | * | 7/1973 | Lieberman | .......... B65B 67/1266 |
| | | | | | 53/384.1 |

(Continued)

OTHER PUBLICATIONS

Misumi, "Switch-Switching Three-Sided Absorption Magnet Block," [Accessed Online May 13, 2021] https://tw.misumi-ec.com/vona2/detail/110302191370/.

(Continued)

*Primary Examiner* — Patrick D Hawn
(74) *Attorney, Agent, or Firm* — Patterson + Sheridan, LLP

(57) ABSTRACT

Aspects described herein include an apparatus for retaining a bag, and a related checkout system. The apparatus comprises a base portion that is positionable, by a user, at any of a plurality of positions along a surface. The base portion comprises one or more attachment members operable by the user to removably attach the base portion to the surface at a selected position of the plurality of positions. The apparatus further comprises a support portion projecting upwardly from the base portion, and one or more arms projecting outwardly from the support portion. The one or more arms are dimensioned to receive one or more handles of the bag.

18 Claims, 6 Drawing Sheets

(56) References Cited

U.S. PATENT DOCUMENTS

| | | | | |
|---|---|---|---|---|
| 4,069,993 A * | 1/1978 | Shanks | B65B 67/1233 248/101 |
| 4,329,673 A * | 5/1982 | Uchikune | H01F 7/04 335/302 |
| 4,487,388 A * | 12/1984 | Provan | B65B 67/1227 248/97 |
| 4,819,898 A * | 4/1989 | Benoit | B65B 67/1227 248/97 |
| 4,840,336 A * | 6/1989 | Stroh | B65B 67/1227 D34/5 |
| 5,050,825 A * | 9/1991 | Bratset | A47F 13/085 248/97 |
| 5,131,499 A * | 7/1992 | Hoar | B65B 67/04 248/97 |
| 5,213,145 A * | 5/1993 | Huang | A47F 13/085 141/390 |
| 5,310,102 A * | 5/1994 | Hougham | B65B 67/1227 224/267 |
| 5,924,573 A * | 7/1999 | Piraneo | B65D 33/001 383/207 |
| 6,042,063 A * | 3/2000 | Kerr | B65B 67/1227 248/97 |
| 6,199,788 B1 * | 3/2001 | Simhaee | B65H 23/08 242/422.1 |
| 6,550,583 B1 * | 4/2003 | Brenhouse | A47F 9/048 186/61 |
| 6,585,197 B1 * | 7/2003 | Daniels | A47F 9/042 248/97 |
| 6,707,360 B2 * | 3/2004 | Underwood | B23Q 3/1546 269/8 |
| 7,066,389 B2 * | 6/2006 | Dickover | G01G 19/4144 235/383 |
| 7,128,251 B1 * | 10/2006 | Galle | B65H 35/10 225/2 |
| 7,967,153 B2 * | 6/2011 | Simhaee | B65B 67/1227 211/85.15 |
| 8,400,324 B1 * | 3/2013 | Jaeger | G08B 21/24 232/62 |
| 8,540,195 B2 * | 9/2013 | Astwood | B65B 67/1227 24/318 |
| 8,640,890 B2 * | 2/2014 | Schiller | F16B 47/00 211/85.15 |
| 9,265,364 B2 * | 2/2016 | Tan | B65D 83/08 |
| 9,622,598 B1 * | 4/2017 | Davis, Jr. | A47F 9/042 |
| 9,622,599 B2 * | 4/2017 | Davis, Jr. | A47F 9/042 |
| 9,676,542 B1 * | 6/2017 | Tan | A47F 13/08 |
| 9,844,283 B2 * | 12/2017 | Bacallao | B65B 67/1238 |
| 10,028,597 B2 * | 7/2018 | Bacallao | B65B 67/1233 |
| 10,028,598 B2 * | 7/2018 | Bacallao | A47F 5/01 |
| 10,086,967 B2 * | 10/2018 | Bacallao | A47F 9/043 |
| 10,610,032 B2 * | 4/2020 | Bacallao | A47F 9/042 |
| 10,617,236 B2 * | 4/2020 | Bacallao | A47B 49/00 |
| 10,625,895 B2 * | 4/2020 | Bacallao | B65B 67/1233 |
| 11,439,256 B2 * | 9/2022 | Dungan | B65B 67/1233 |
| 11,511,913 B2 * | 11/2022 | Tan | B65D 33/001 |
| 2002/0145086 A1 * | 10/2002 | Alvarado | A47F 13/085 248/95 |
| 2007/0186515 A1 * | 8/2007 | Ruetten | G07G 1/0072 211/85.15 |
| 2010/0314507 A1 * | 12/2010 | Laitila | B65B 67/1227 248/97 |
| 2015/0048039 A1 * | 2/2015 | Laitila | B65B 67/1233 211/85.15 |
| 2018/0222620 A1 * | 8/2018 | Lewis | B65B 35/30 |
| 2019/0008291 A1 * | 1/2019 | Bacallao | B65B 67/1266 |
| 2021/0298495 A1 * | 9/2021 | Barr | B65B 67/1227 |

OTHER PUBLICATIONS

Switch type magnetic base-switch type magnetic base wholesale, promotional price, source of origin-Alibaba [Accessed Online May 13, 2021] https://tw.1688.com/item/-BFAAB9D8CABDB4C5C1A6D7F9.html.

* cited by examiner

US 12,096,869 B2

REPOSITIONABLE BAG-RETAINING DEVICE

BACKGROUND

The present disclosure relates to self-checkout systems, and more specifically, to implementations of a repositionable bag-retaining device for use in self-checkout systems.

Current implementations of self-checkout systems may include one or more bag-retaining devices that arrange reusable and/or one-time use bags for bagging items. The bag-retaining device(s) are often arranged in a fixed configuration, that is, the number and arrangement of the bag-retaining device(s) cannot be dynamically adjusted to accommodate user requirements and preferences.

SUMMARY

According to one embodiment, an apparatus is disclosed for retaining a bag. The apparatus comprises a base portion that is positionable, by a user, at any of a plurality of positions along a surface. The base portion comprises one or more attachment members operable by the user to removably attach the base portion to the surface at a selected position of the plurality of positions. The apparatus further comprises a support portion projecting upwardly from the base portion, and one or more arms projecting outwardly from the support portion. The one or more arms are dimensioned to receive one or more handles of the bag.

According to another embodiment, a checkout system comprises one or more platforms defining one or more surfaces, and a plurality of bagging stations that are positionable, by a user, at any of a plurality of positions along a respective surface of the one or more surfaces. Each bagging station comprises a base portion comprising one or more attachment members operable by the user to removably attach the base portion to a surface of the one or more surfaces at a selected position. Each bagging station further comprises a support portion projecting upwardly from the base portion, and one or more arms projecting outwardly from the support portion. The one or more arms are dimensioned to receive one or more handles of a bag.

BRIEF DESCRIPTION OF THE SEVERAL VIEWS OF THE DRAWINGS

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of the disclosure and are therefore not to be considered limiting of its scope, for the disclosure may admit to other equally effective embodiments.

DETAILED DESCRIPTION

Aspects of the current disclosure relate to an apparatus for retaining a bag. The apparatus comprises a base portion that is positionable, by a user, at any of a plurality of positions along a surface. The base portion comprises one or more attachment members operable by the user to removably attach the base portion to the surface at a selected position of the plurality of positions. The apparatus further comprises a support portion projecting upwardly from the base portion, and one or more arms projecting outwardly from the support portion. The one or more arms are dimensioned to receive one or more handles of the bag.

In some embodiments, the plurality of positions are predefined. In other embodiments, the plurality of positions may be arbitrarily selected by the user.

Beneficially, the apparatus allows the configuration of the bagging area of a checkout terminal (e.g., a self-checkout terminal) to be dynamically adjusted by the user to accommodate the particular shapes and sizes of items selected by the user, the preferences of the user, and so forth. In this way, the checkout terminal may provide greater accessibility.

While features of the bag-retaining apparatus are discussed primarily within the context of a self-checkout system in a shopping environment (e.g., within a retail store), it is contemplated that the techniques disclosed herein may be applied to other types of checkout systems (e.g., manned by a store associate) as well as other environments (some non-limiting examples include libraries, museums, classrooms, hospitals, etc.). For example, in implementations of a checkout system manned by a store associate, the various actions attributed to a user may be performed by the store associate and/or by a customer.

Figure 1:
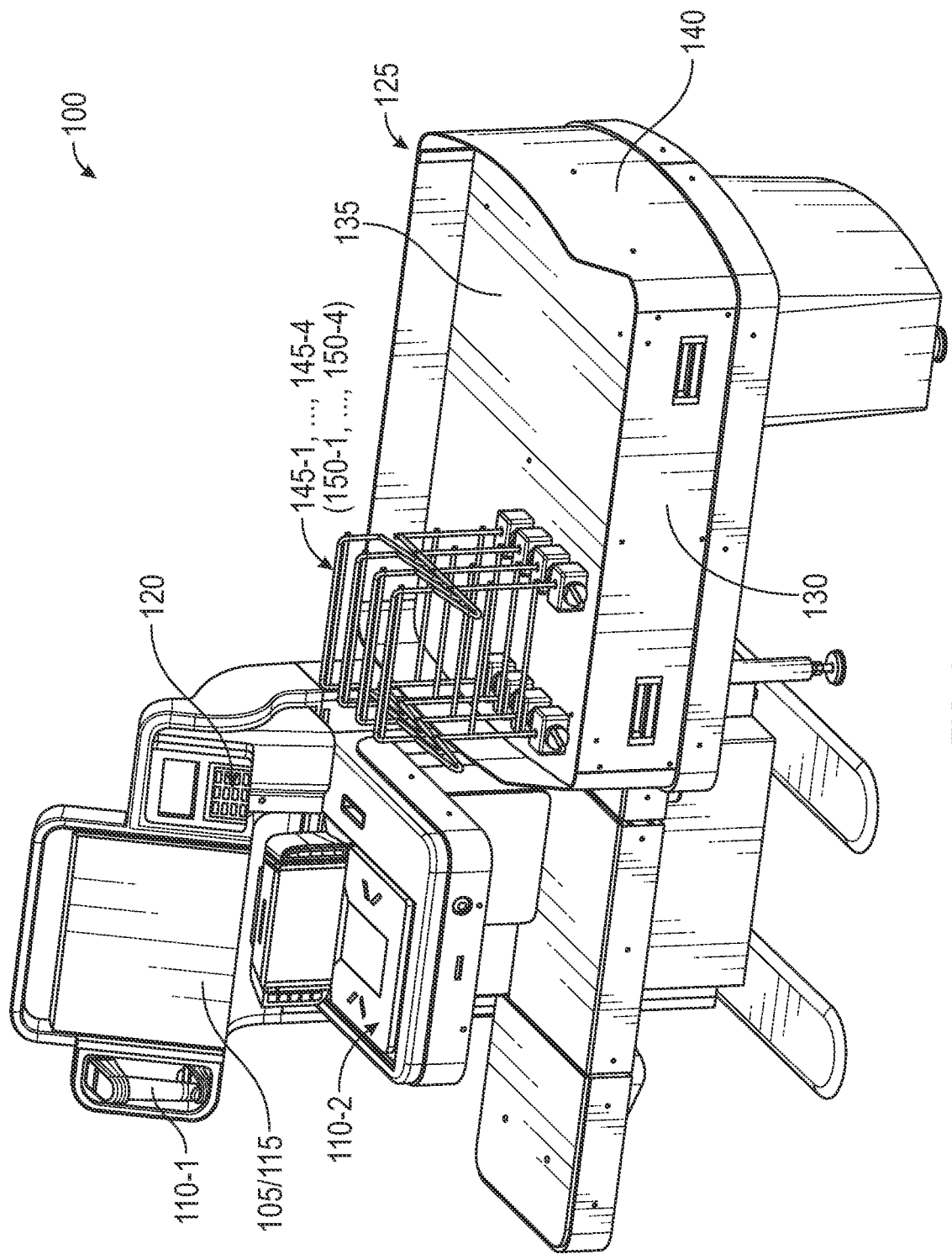
FIG. 1 illustrates an exemplary implementation of a self-checkout system, according to one or more embodiments.

FIG. 1 illustrates an exemplary implementation of a self-checkout system, according to one or more embodiments. The self-checkout system includes a self-checkout terminal 100 generally includes functionality that enables a user to perform some or all of the stages of a self-checkout transaction, such as scanning items, weighing items, bagging items, presenting payment, and providing a paper or electronic receipt.

The self-checkout terminal 100 comprises a display system 105 that presents information viewable by a user (e.g., a user or an associate) during various stages of a self-checkout transaction. The display system 105 is communicatively coupled with one or more computer processors, which may be integrated into the self-checkout terminal 100 or external to the self-checkout terminal 100. For example, the one or more computer processors may be included in a computing device integrated with the self-checkout terminal 100, which may be further networked with other computing devices. In some embodiments, the display system 105 comprises multiple, overlapping display screens using any suitable display technology or technologies, such as a liquid crystal display (LCD), an organic light-emitting diode (OLED) display, and so forth. In some embodiments, the display system 105 includes an input device 115 that receives inputs from the user during the self-checkout transaction. For example, the input device 115 may include a touch-sensitive screen using any suitable sensing technology, such as capacitive sensing, resistive sensing, and so forth.

The self-checkout terminal 100 further comprises one or more item scanners 110-1, 110-2 (collectively or generically, item scanner(s) 110). Each item scanner 110 is communicatively coupled with the one or more computer processors, and in conjunction with the one or more computer processors visually identifies items during scanning. For example, each item scanner 110 may detect encoded portions (e.g., a Universal Product Code (UPC) or a Quick Response (QR) code) and/or may compare imagery of the item with reference image(s) to identify a type of the item.

In some embodiments, the item scanner 110-1 comprises a handheld scanner that may be manually aimed by a user at items to scan the items, and the item scanner 110-2 is integrated into a surface of the self-checkout terminal 100. In some embodiments, the item scanner 110-2 further includes one or more load cells for measuring weights of items.

The self-checkout terminal 100 further comprises a payment receiver that may be fully or partly integrated into the display system 105. In some embodiments, the payment receiver is fully integrated into the display system 105 (e.g., using the input device 115). In other embodiments, the payment receiver is partly integrated into the display system 105. In one example, the touch input device may provide a pinpad for a credit card terminal that is external to the display system 105. In another example, the payment receiver may include a cash receiver, e.g., in a forward panel of the self-checkout terminal 100, that is configured to receive banknotes and/or coins from a user as payment for the self-checkout transaction. In some cases, the cash receiver may be further configured to dispense banknotes and/or coins to the user as change.

The self-checkout terminal 100 further comprises a printer 120 that prints or otherwise provides tangible item(s) to the user. The printer 120 is communicatively coupled with the one or more computer processors. In some embodiments, the printer 120 generates paper receipts for the self-checkout transaction and/or coupons.

The self-checkout terminal 100 further comprises a bagging area 125 comprising a plurality of bagging stations 145-1, . . . , 145-4 (collectively or generically, bagging station(s) 145). Each bagging station 145 includes structure suitable for dispensing, supporting, suspending, and/or retaining single-use shopping bags and/or reusable bags or totes. As shown, the bagging stations 145-1, . . . , 145-4 comprise bag-retaining devices 150-1, . . . , 150-4 that are disposed on a top surface 135 of a fixed platform 130. As shown, sidewalls 140 extend around portions of the fixed platform 130 to bound the bagging area 125.

Each bag-retaining device 150-1, . . . , 150-4 is configured to engage with portions of one or more types of bags. In some embodiments, the bag-retaining devices 150-1, . . . , 150-4 include arms or other features that receive handles of the bags. In some embodiments, the bag-retaining devices 150-1, . . . , 150-4 include clips or other features that engage sides of the bags.

Each bag-retaining device 150-1, . . . , 150-4 comprises one or more attachment members that are operable by the user to removably attach the bag-retaining device 150-1, . . . , 150-4 to the top surface 135 at a selected position. In this way, the configuration of the bagging area 125 may be dynamically adjusted by the user to accommodate the particular shapes and sizes of items selected by the user, the preferences of the user, and so forth. In this way, the self-checkout terminal 100 may provide greater accessibility.

Although the self-checkout terminal 100 is shown as including the plurality of bag-retaining devices 150-1, . . . , 150-4 on the fixed platform 130, other configurations of the self-checkout terminal 100 are also contemplated, such as different numbers and/or arrangements of the bag-retaining devices 150-1, . . . , 150-4, multiple platforms, movable platform(s) (e.g., a rotatable carousel), and so forth.

Thus, during exemplary operation of the self-checkout terminal 100, a user may transport one or more items to the self-checkout terminal 100 to initiate a self-checkout transaction. The user may reconfigure the bagging area 125 by moving one or more of the bag-retaining devices 150-1, . . . , 150-4 to positions along the top surface 135, and operating the attachment members to attach the bag-retaining devices 150-1, . . . , 150-4 in the desired positions. The user scans the item(s) using the item scanners 110-1, 110-2 and places the item(s) once scanned into the bagging area 125, e.g., into bags retained by the bag-retaining devices 150-1, . . . , 150-4 or onto the fixed platform 130. The user may present payment for the items using the payment receiver of the self-checkout terminal 100.

Figure 2:
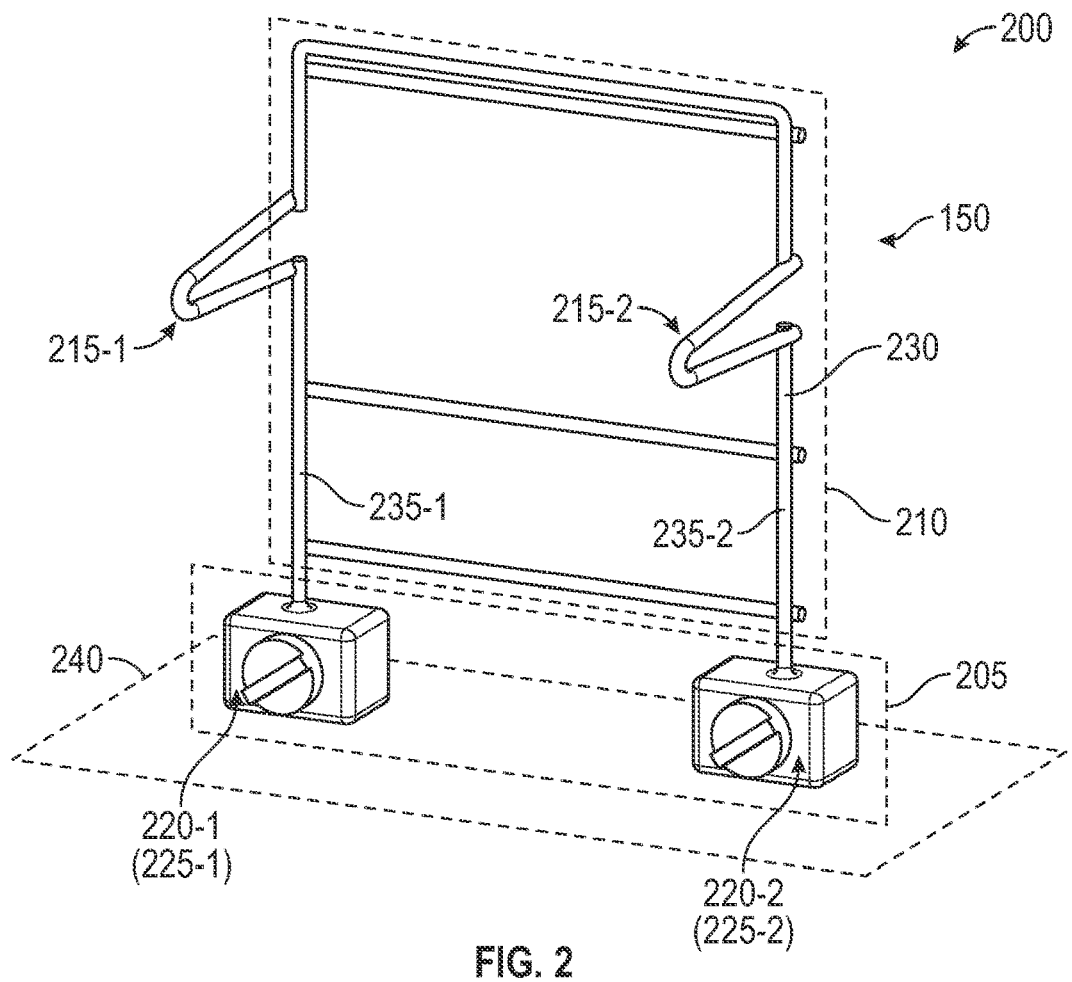
FIG. 2 illustrates a bag-retaining device, according to one or more embodiments.

FIG. 2 illustrates a bag-retaining device, according to one or more embodiments. The features illustrated in diagram 200 may be used in conjunction with other embodiments, e.g., one possible implementation of the bag-retaining device 150.

In the diagram 200, the bag-retaining device 150 comprises a base portion 205, a support portion 210, and arms 215-1, 215-2. The base portion 205 comprises one or more attachment members 220-1, 220-2 that are user-operable to removably attach the base portion 205 to a surface 240 at a selected position. The top surface 135 of the fixed platform 130 represents one example of the surface 240.

The attachment members 220-1, 220-2 may attach to the surface 240 using any suitable means. In some embodiments, the attachment members 220-1, 220-2 comprise magnetic components that magnetically couple with corresponding portions of the fixed platform 130 (e.g., metal at or below the top surface 135). In some embodiments, the attachment members 220-1, 220-2 comprise mechanical components such as latches that mechanically engage with corresponding portions of the fixed platform 130 (e.g., keepers arranged at or near the top surface 135). In some embodiments, the attachment members 220-1, 220-2 comprise rollers that are received into corresponding detents formed into the top surface 135. Other types of attachment force are also contemplated, such as suction force.

Figure 3:
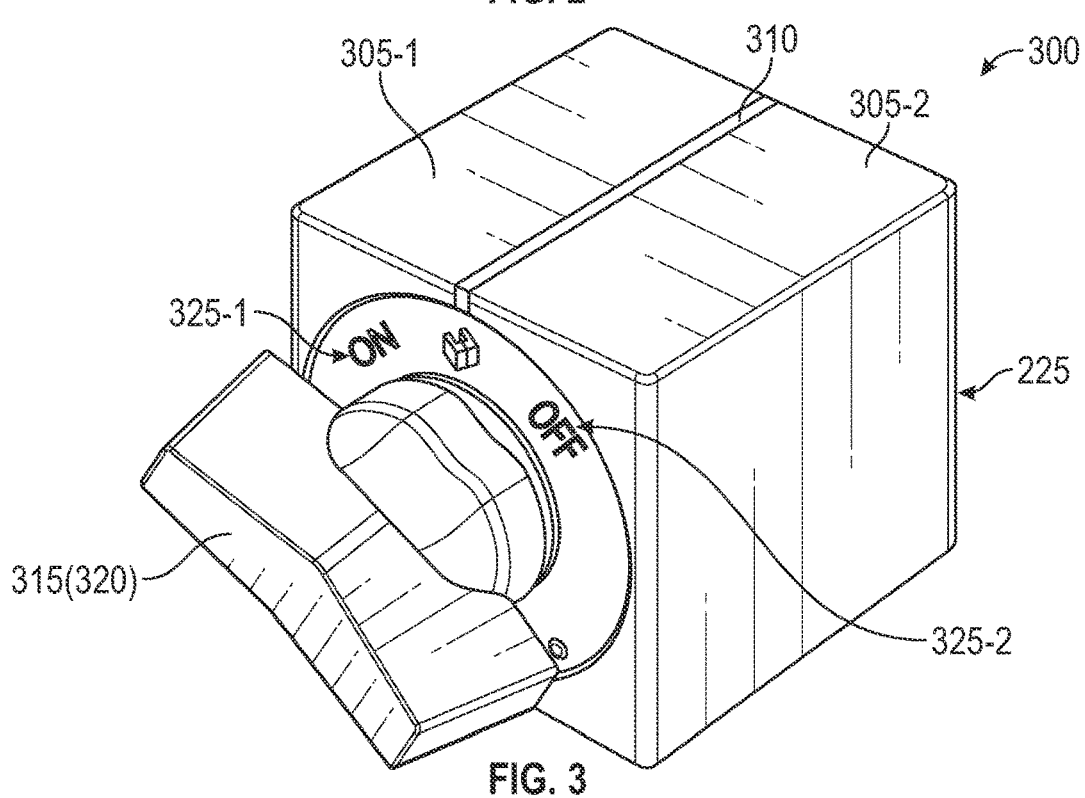
FIG. 3 illustrates a switchable magnet block, according to one or more embodiments.

In some embodiments, the attachment members 220-1, 220-2 comprise switchable magnet blocks 225-1, 225-2 that are user-operable to magnetically attach the base portion 205 to magnetic metal arranged at or near the surface 240. Referring now to FIG. 3, diagram 300 illustrates an example implementation of the switchable magnet block 225. The switchable magnet block 225 comprises magnetic pole members 305-1, 305-2 that are spaced apart by a non-magnetic member 310. Although not visible in the diagram 300, a volume is defined between the magnetic pole members 305-1, 305-2 (e.g., a bore), and a permanent magnet is rotatably disposed within the volume. A knob 320 is attached to the permanent magnet and represents one type of a user control 315 for the attachment members 220-1, 220-2. The knob 320 is operable by the user to rotate the permanent magnet between a first position 325-1 in which the magnetic pole members 305-1, 305-2 are in an excited state ("ON"), and a second position 325-2 in which the magnetic pole members 305-1, 305-2 are in a non-excited state ("OFF"). In the excited state, the magnetic pole members 305 apply magnetic force to attach the switchable magnet block 225 to the surface 240. In the non-excited state, the magnetic pole members 305 applies no magnetic force (or insufficient magnetic force) to attach the switchable magnet block 225 to the surface 240. Additional implementation details of the switchable magnet block 225 are described in U.S. Pat. No. 4,329,673, entitled "Switchable permanent magnet holding device", which is incorporated herein by reference in its entirety.

Figure 4:
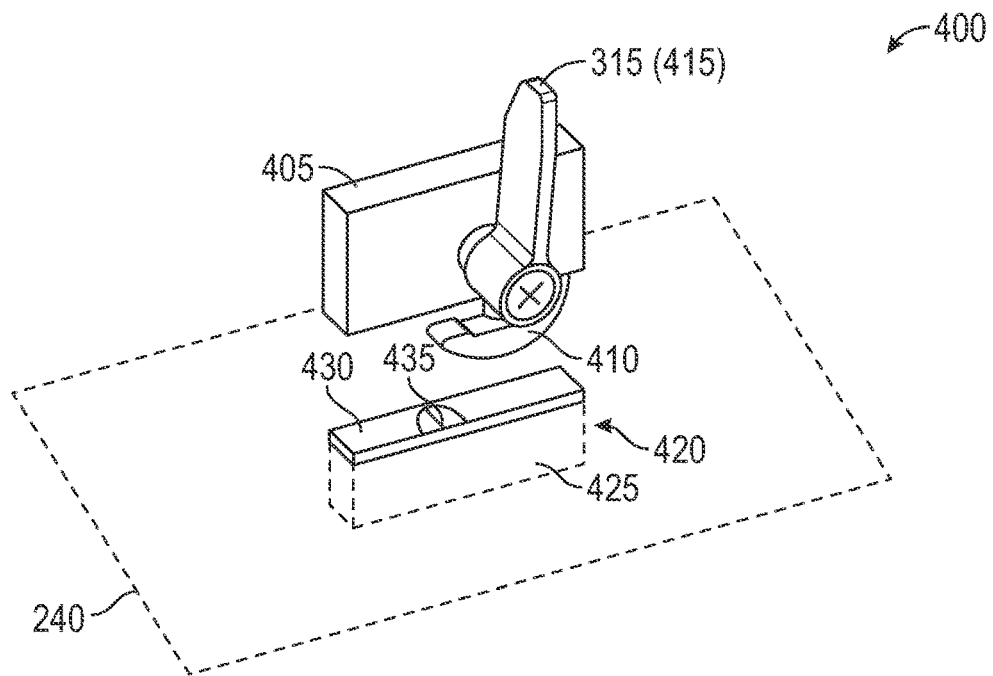
FIG. 4 illustrates an attachment member comprising a latch operable to engage a keeper at a surface, according to one or more embodiments.

Next, a diagram 400 of FIG. 4 illustrates another implementation of the attachment members 220-1, 220-2 comprising a latch 410 operable to engage a keeper 420 at the surface 240.

A body 405 defines an interior volume in which the latch 410 is rotatably disposed. A lever 415 is operatively connected with an axle that extends through the body 405 into the interior volume. The axle is connected with the latch 410. The lever 415 represents another type of the user control 315 for the attachment members 220-1, 220-2.

The keeper 420 comprises a body 425, an opening 430 that extends into the body 425, and a post 435 connected to the body 425 and extending across in the opening 430. As shown, the body 425 of the keeper 420 is arranged beneath the surface 240. However, alternate implementations may arrange the keeper 420 partly or entirely above the surface 240.

The lever 415 is operable by the user to rotate the latch 410 between a retracted position in which the latch 410 is not engaged with the post 435, and an extended position in which the latch is engaged with the post 435. In some embodiments, the lever 415 may be disposed entirely within the interior volume of the body 405 when in the retracted position, but this is not a requirement.

Returning to FIG. 2, the support portion 210 projects upwardly from the base portion 205. The support portion 210 may be formed of any suitable material(s) having sufficient rigidity to support a bag and one or more items contained therein, when the base portion 205 is attached to the surface 240. In some embodiments, the support portion 210 comprises a wire form 230 having one or more vertical wires 235-1, 235-2, and one or more horizontal wires extending between the vertical wires 235-1, 235-2. In alternate embodiments, the support portion 210 may be a wall portion comprising a solid shape, such as being formed out of sheet metal.

The support portion 210 may be vertically oriented (in some cases, extending perpendicular to the surface 240) or angled relative to a vertical orientation. The support portion 210 may be attached to the base portion 205 using any suitable techniques, e.g., fastened or welded. In some embodiments, each of the attachment members 220-1, 220-2 (e.g., the switchable magnet blocks 225-1, 225-2) is attached to a respective vertical wire 235-1, 235-2.

The arms 215-1, 215-2 project outwardly from the support portion 210. As shown, the arms 215-1, 215-2 comprise v-shaped wires that are integrated into the wire form 230. In other embodiments, the arms 215-1, 215-2 may have different shapes and/or may be differently attached to the support portion 210.

In some embodiments, the arms 215-1, 215-2 extend substantially parallel to the surface 240 (e.g., perpendicular to the vertical wires 235-1, 235-2). The v-shaped wires may be considered substantially parallel to the surface 240, as a central axis of the arms 215-1, 215-2 is parallel to the surface 240.

In some embodiments, the arms 215-1, 215-2 are dimensioned such that a first instance of the bag-retaining device 150 is stackable with at least a second instance of the bag-retaining device 150. In some embodiments, the arms 215-1, 215-2 are contoured to engage, within the respective plane(s) of the arms 215-1, 215-2, with corresponding arms 215-1, 215-2 of the second instance.

Figure 5:
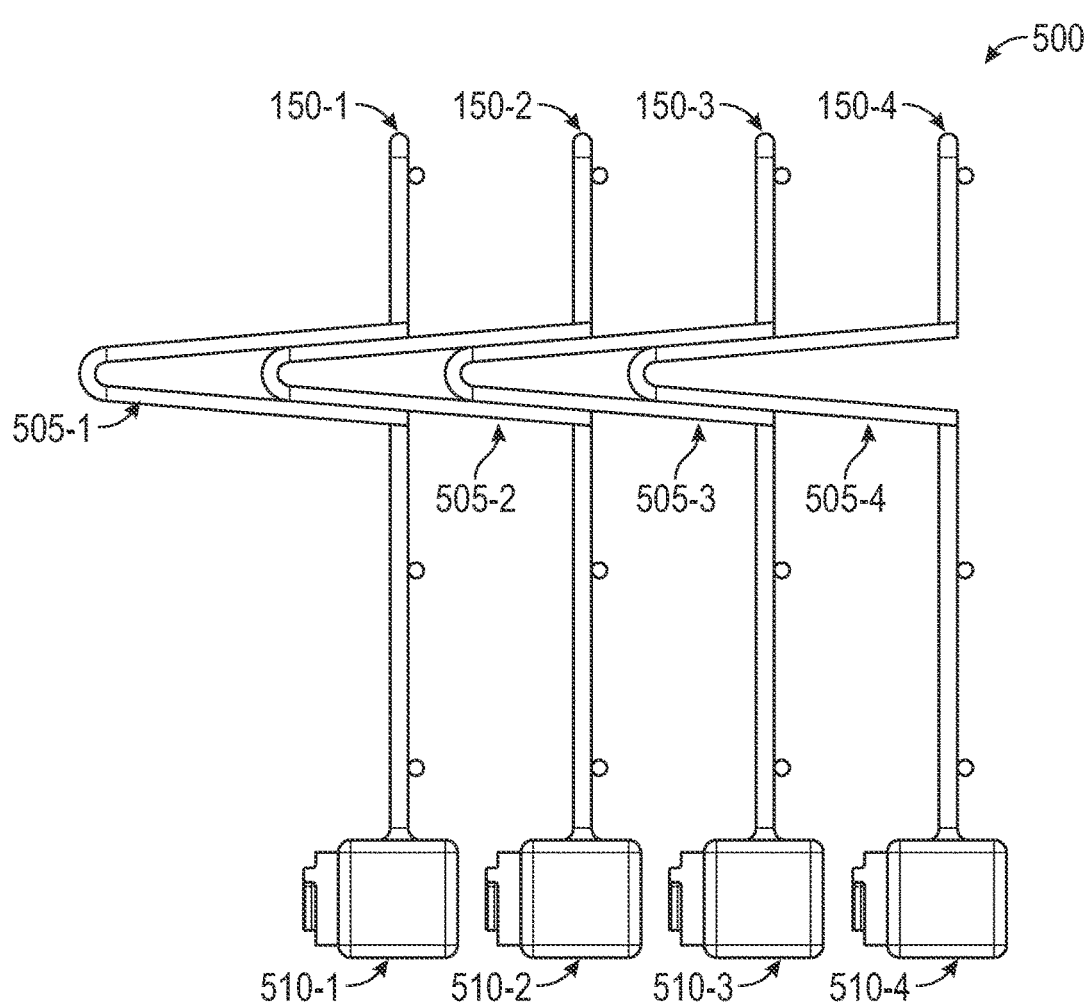
FIG. 5 illustrates bag-retaining devices in a stacked configuration, according to one or more embodiments.

Diagram 500 of FIG. 5 is a side view of a plurality of bag-retaining devices 150-1, 150-2, 150-3, 150-4 in a stacked configuration, according to one or more embodiments. The bag-retaining devices 150-1, 150-2, 150-3, 150-4 comprise respective arms 505-1, 505-2, 505-3, 505-4 (e.g., representing multiple instances of the arm 215-2 of FIG. 2). The arms 505-1, 505-2, 505-3, 505-4 are contoured (e.g., sloped) to engage with each other within the respective planes of the arms 505-1, 505-2, 505-3, 505-4. Stated another way, the arms 505-1, 505-2, 505-3, 505-4 are dimensioned such that the v-shapes of the arms 505-1, 505-2, 505-3, 505-4 nest with each other.

In some embodiments, the arms 505-1, 505-2, 505-3, 505-4 are dimensioned such that the attachment members 510-1, 510-2, 510-3, 510-4 (e.g., representing multiple instances of the attachment member 220-2 of FIG. 2) do not contact each other when the bag-retaining devices 150-1, 150-2, 150-3, 150-4 are in the stacked configuration. Stated another way, each of the arms 505-1, 505-2, 505-3, 505-4 may be dimensioned to limit travel of adjacent one(s) of the arms 505-1, 505-2, 505-3, 505-4.

Figure 6A:
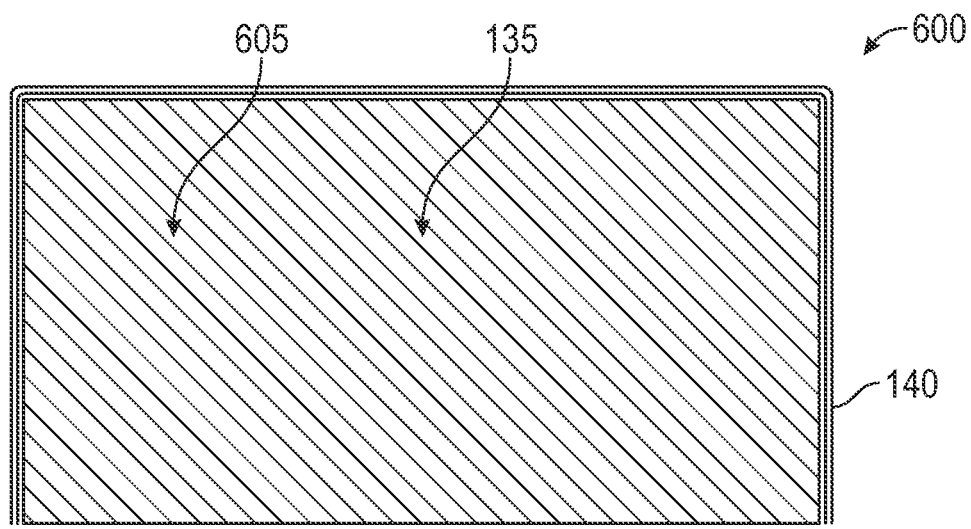
FIGS. 6A and 6B illustrate arrangements of a magnetic metal at or near a surface of a bagging area, according to one or more embodiments.
Figure 6B:
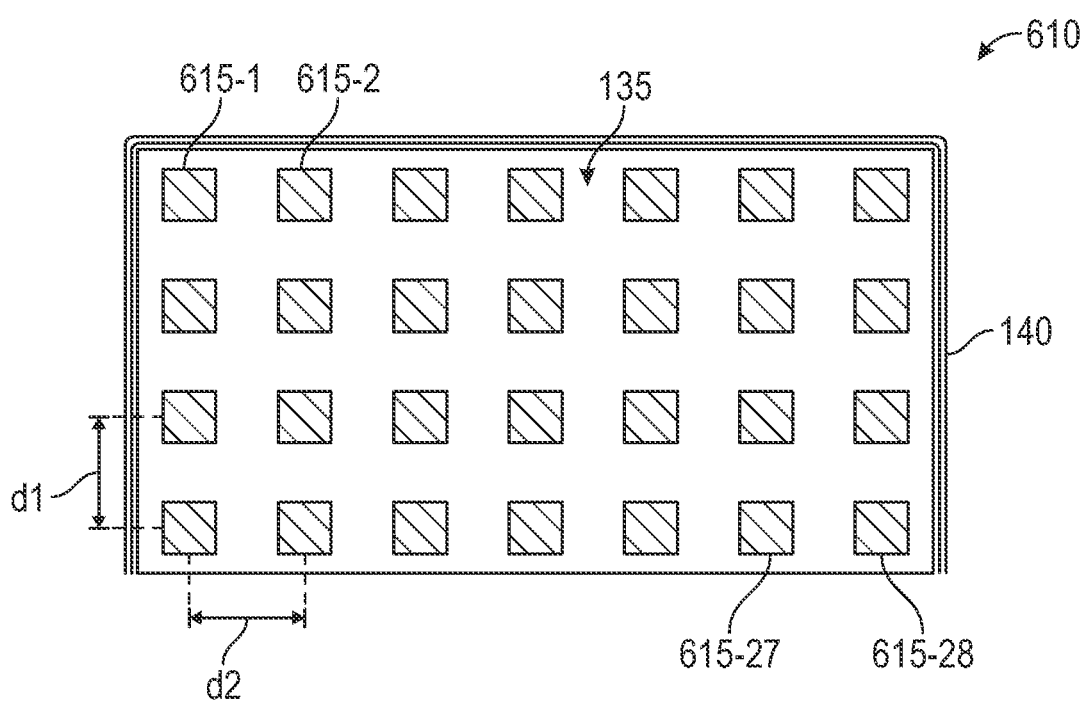

FIGS. 6A and 6B illustrate arrangements of a magnetic metal at or near a surface of a bagging area, according to one or more embodiments. More specifically, diagrams 600, 610 are top views of the bagging area 125 of FIG. 1. The features illustrated in diagrams 600, 610 may be used in conjunction with other embodiments. For example, the arrangements of the magnetic metal may be used in the fixed platform 130 of FIG. 1.

In the diagram 600, a magnetic metal 605 shown by the hatching is substantially coextensive with the top surface 135. The magnetic metal 605 may have any suitable implementation, e.g., iron or iron alloys such as steel. In some embodiments, the magnetic metal 605 is arranged at the top surface 135. For example, the top surface 135 may comprise sheet steel. In other embodiments, the magnetic metal 605 may be arranged beneath the top surface 135. For example, the sheet steel may be arranged beneath a plastic layer that provides greater durability and/or lower friction as the user repositions the attachment members 220-1, 220-2 by sliding them around the top surface 135.

In the diagram 610, the magnetic metal is arranged as an array of discrete metal sections 615-1, 615-2, . . . , 615-27, 615-28 at or near the top surface 135. The discrete metal sections 615-1, 615-2, . . . , 615-27, 615-28 are shown as a rectangular array of four (4) rows and seven (7) columns, where the rows are spaced apart by a first distance d1 and the columns are spaced apart by a second distance d2. In some embodiments, the distances d1 and d2 are selected to correspond to a spacing of the attachment members 220-1, 220-2 of the bag-retaining device 150. In this way, the bag-retaining device 150 may be arranged at any of a plurality of positions along the top surface 135. Although the discrete metal sections 615-1, 615-2, . . . , 615-27, 615-28 are shown in a rectangular array, alternate implementations may include different numbers and/or different arrangement of the discrete metal sections 615-1, 615-2, . . . , 615-27, 615-28, which may include irregular arrays.

In some embodiments, the distances d1 and d2 are also selected such that the bag-retaining device 150 may have different orientations in the different positions. In one non-limiting example, the distances d1 and d2 are equal, allowing the bag-retaining device 150 to be positioned with the arms 215-1, 215-2 extending in any of the forward (180 degrees), aft (zero degrees), left (270 degrees), or right (90 degree) directions.

In some embodiments, visual indicators are disposed above the discrete metal sections 615-1, 615-2, . . . , 615-27, 615-28 to indicate the locations of the discrete metal sections 615-1, 615-2, . . . , 615-27, 615-28 to the user. In some embodiments, the visual indicators are passive (e.g., stick-on markers applied to the top surface 135). In some embodiments, the visual indicators are active (e.g., indicator lights viewable at the top surface 135). In some embodiments, the self-checkout terminal 100 may generate control signals to selectively illuminate the indicator lights. For example, the self-checkout terminal 100 may operate the indicator lights to prescribe or suggest locations for the bag-retaining devices 150-1, 150-2, 150-3, 150-4 based on characteristics of the items (e.g., dimensions, weights, temperatures) that were transported by the user to the self-checkout terminal 100.

Figure 7A:
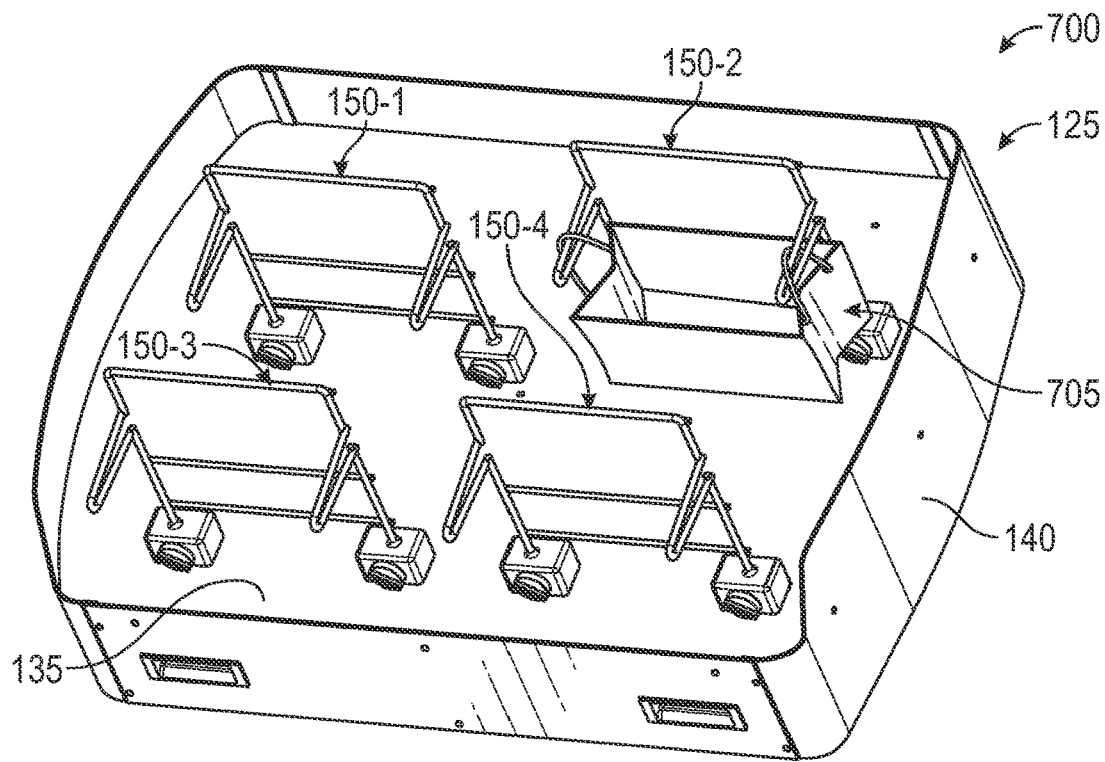
FIGS. 7A and 7B illustrate arrangements of bag-retaining devices at a surface of a bagging area, according to one or more embodiments.
Figure 7B:
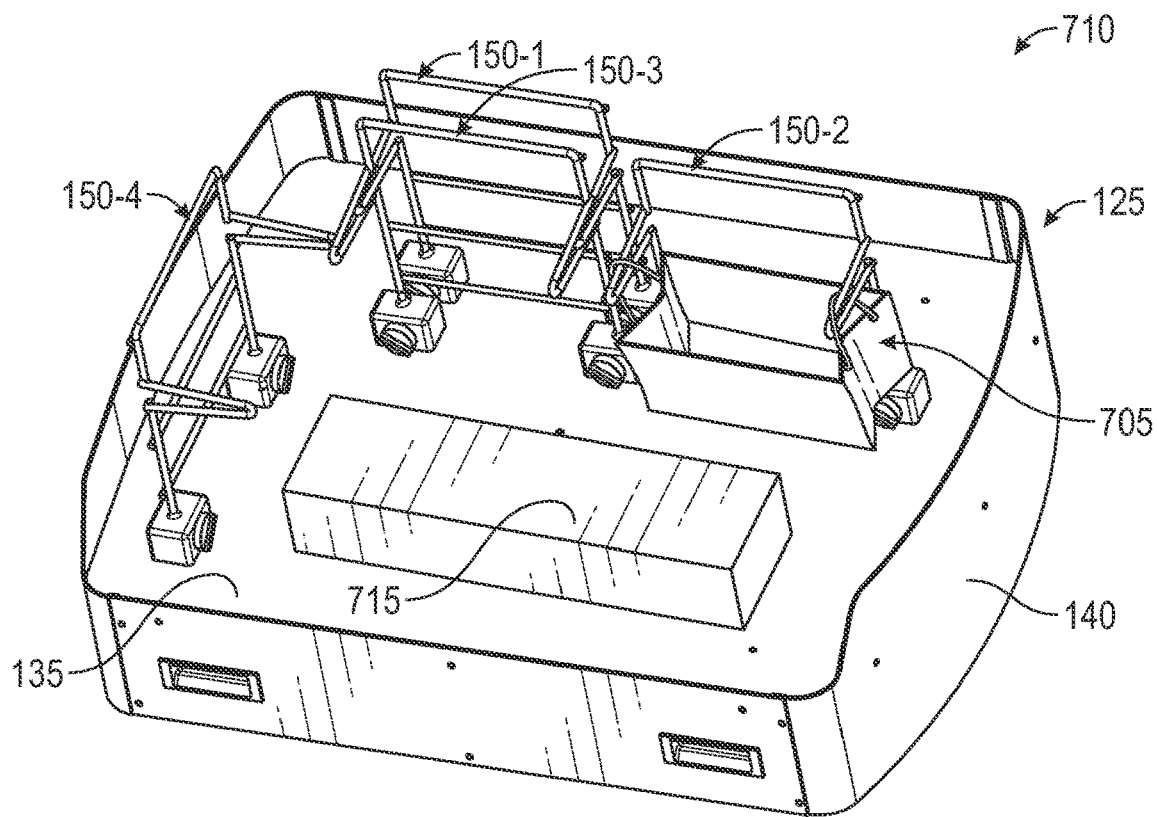

FIGS. 7A and 7B illustrate arrangements of the bag-retaining devices 150-1, 150-2, 150-3, 150-4 at a surface of a bagging area 125, according to one or more embodiments. The features illustrated in diagrams 700, 710 may be used in conjunction with other embodiments. For example, a user operating the self-checkout terminal 100 of FIG. 1 may arrange the bag-retaining devices 150-1, 150-2, 150-3, 150-4 into the arrangements shown in the diagrams 700, 710, and may operate the attachment members 220-1, 220-2 to attach the bag-retaining devices 150-1, 150-2, 150-3, 150-4 to the top surface 135.

In the diagram 700, the bag-retaining devices 150-1, 150-2, 150-3, 150-4 are oriented with the arms in the forward direction. The bag-retaining devices 150-3, 150-4 are arranged side by side near the forward edge of the bagging area 125. The bag-retaining device 150-1 is arranged behind the bag-retaining device 150-3 (that is, in the aft direction), and the bag-retaining device 150-2 is arranged behind the bag-retaining device 150-4. The handles of a reusable bag 705 are received by arms of the bag-retaining device 150-2.

In the diagram 710, the user wishes to place an elongated item 715 into the bagging area 125. To accommodate the elongated item 715 on the top surface 135, the user may operate the attachment members 220-1, 220-2 to release the bag-retaining devices 150-1, 150-3, 150-4. The user may then move the bag-retaining devices 150-1, 150-3 in the aft direction and arrange them in a stacked configuration. The user may also move the bag-retaining device 150-4 in the left direction and reorient to have the arms in the right direction. The user may selectively attach the bag-retaining devices 150-1, 150-3, 150-4 in their new positions.

Figure 8:
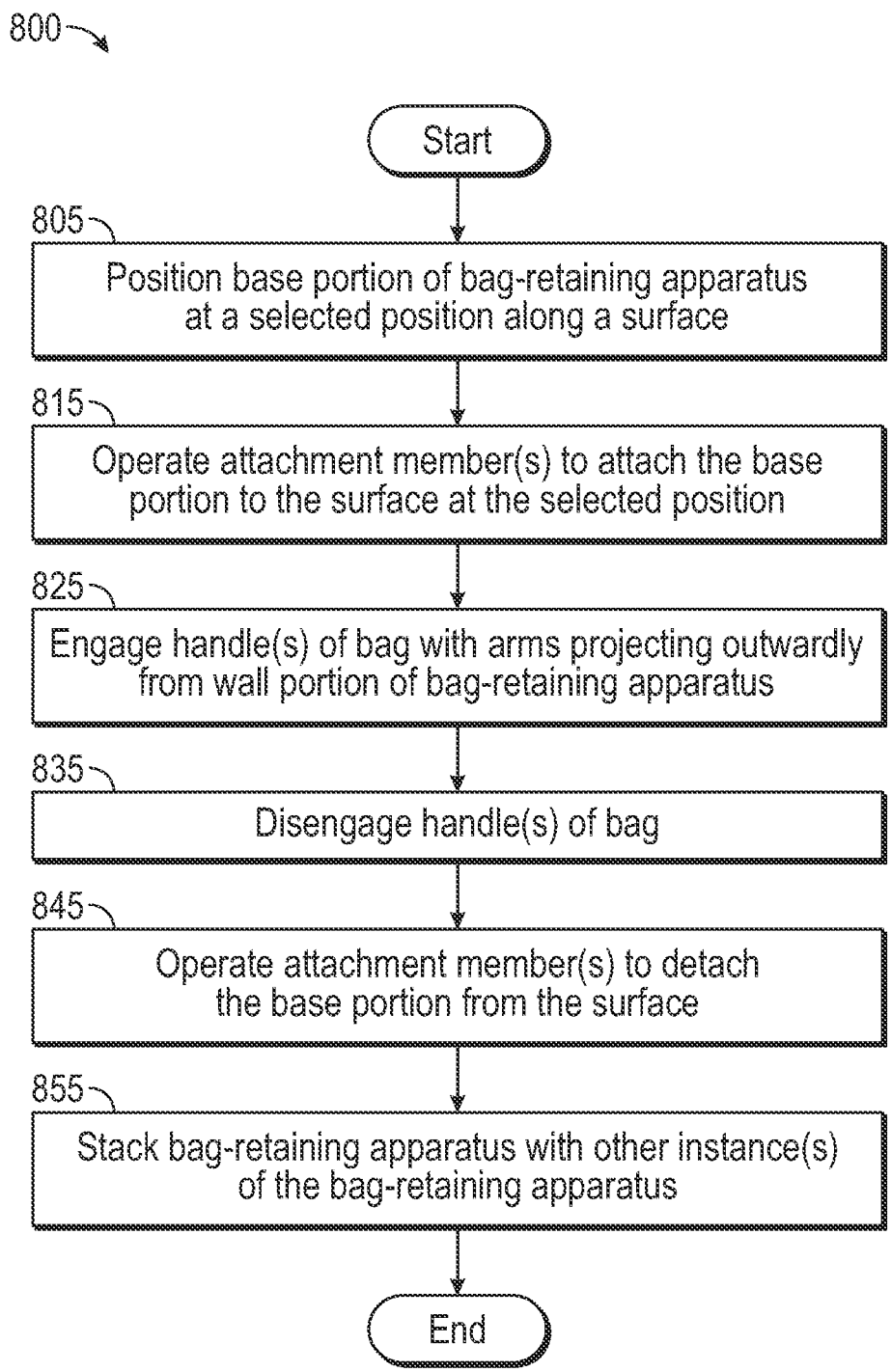
FIG. 8 is a method of performing a self-checkout transaction, according to one or more embodiments.

FIG. 8 is a method 800 of performing a self-checkout transaction, according to one or more embodiments. The method 800 may be performed in conjunction with other embodiments described herein, such as using the self-checkout terminal 100 of FIG. 1. The method 800 begins at block 805, where a base portion of a bag-retaining apparatus is positioned at a selected position along a surface. At block 815, one or more attachment members are operated to attach the base portion to the surface at the selected position.

At block 825, handles of a bag are engaged with arms that project outwardly from a support portion of the bag-retaining apparatus. At block 835, the handles of the bag are disengaged. In some embodiments, disengaging the handles occurs after one or more items have been added to the bag.

At block 845, the one or more attachment members are operated to detach the base portion from the surface. At block 855, the bag-retaining apparatus is stacked with one or more other instances of the bag-retaining apparatus. The method 800 ends following completion of block 855.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An apparatus for retaining a bag, the apparatus comprising:
   a base portion that is positionable, by a user, at any of a plurality of positions along a surface, the base portion comprising a magnetic block, wherein the magnetic block comprises a switch operable by the user to removably and magnetically attach the base portion to metal arranged at or near the surface at a selected position of the plurality of positions;
   a support portion projecting upwardly from the base portion; and
   one or more arms projecting outwardly from the support portion, wherein the one or more arms are dimensioned to receive one or more handles of the bag.

2. The apparatus of claim 1,
   wherein the support portion comprises a wire form, and
   wherein the magnet block is attached to a vertical wire of the wire form.

3. The apparatus of claim 1, wherein the surface comprises sheet steel.

4. The apparatus of claim 1, wherein the metal is disposed beneath the surface.

5. The apparatus of claim 3,
wherein the metal comprises a plurality of discrete metal sections distributed beneath the surface, and
wherein the surface includes a plurality of visual indicators above the plurality of discrete metal sections.

6. The apparatus of claim 1,
wherein the apparatus is a first instance of the apparatus, and
wherein the one or more arms are dimensioned such that the first instance of the apparatus is stackable with at least a second instance of the apparatus.

7. The apparatus of claim 6, wherein the one or more arms are contoured to engage, within the respective one or more planes of the one or more arms, with a corresponding one or more arms of the second instance.

8. The apparatus of claim 1, wherein the one or more arms are substantially parallel to the surface.

9. The apparatus of claim 1, wherein the base portion comprises one or more latches operable to engage one or more keepers arranged at the surface.

10. The apparatus of claim 9, wherein the one or more keepers extend beneath the surface.

11. A checkout system comprising:
one or more platforms defining one or more surfaces; and
a plurality of bagging stations that are positionable, by a user, at any of a plurality of positions along a respective surface of the one or more surfaces, wherein each bagging station comprises:
a base portion comprising a plurality of switchable magnet blocks operable by the user to removably and magnetically attach the base portion to metal arranged at or near a surface of the one or more surfaces at a selected position;
a support portion projecting upwardly from the base portion; and
one or more arms projecting outwardly from the support portion, wherein the one or more arms are dimensioned to receive one or more handles of a bag.

12. The checkout system of claim 11, wherein the one or more platforms are rotatable.

13. The checkout system of claim 11, wherein, for a first bagging station of the plurality of bagging stations, at least one of the base portion, the support portion, and the one or more arms is shared with at least a second bagging station of the plurality of bagging stations.

14. The checkout system of claim 11,
wherein the support portion comprises a wire form, and
wherein each of the plurality of switchable magnet blocks is attached to a respective vertical wire of the wire form.

15. The checkout system of claim 11, wherein the surface comprises sheet steel.

16. The checkout system of claim 11, wherein the metal is disposed beneath the surface.

17. The checkout system of claim 16,
wherein the metal comprises a plurality of discrete metal sections distributed beneath the surface, and
wherein the surface includes a plurality of visual indicators above the plurality of discrete metal sections.

18. The checkout system of claim 11, wherein the one or more arms of each of the plurality of the bagging stations are dimensioned such that the plurality of the bagging stations are stackable.

* * * * *

UNITED STATES PATENT AND TRADEMARK OFFICE
CERTIFICATE OF CORRECTION

PATENT NO. : 12,096,869 B2
APPLICATION NO. : 17/315253
DATED : September 24, 2024
INVENTOR(S) : Rebecca Hsiao et al.

It is certified that error appears in the above-identified patent and that said Letters Patent is hereby corrected as shown below:

In the Claims

In Column 11, Line 1, in Claim 5, delete "3," and insert -- 4, --.

In Column 11, Line 13, in Claim 7, delete "within the" and insert -- within --.

Signed and Sealed this
Tenth Day of December, 2024

Katherine Kelly Vidal
*Director of the United States Patent and Trademark Office*